United States Patent [19]

Kopecki

[11] Patent Number: 4,872,519

[45] Date of Patent: Oct. 10, 1989

[54] DRILL STRING DRILL COLLARS

[75] Inventor: Denis S. Kopecki, Salt Lake City, Utah

[73] Assignee: Eastman Christensen Company, Salt Lake City, Utah

[21] Appl. No.: 148,024

[22] Filed: Jan. 25, 1988

[51] Int. Cl.[4] ............................................. E21B 17/16
[52] U.S. Cl. .................................. 175/320; 148/12 E; 138/DIG. 6; 166/902
[58] Field of Search ....................... 175/320, 325, 45; 166/242, 66.5, 902; 148/12 E, 12.4; 33/304, 313; 138/DIG. 6, 139, 143, 177; 29/458

[56] References Cited

U.S. PATENT DOCUMENTS

| | | | |
|---|---|---|---|
| 1,121,386 | 12/1914 | Means | 175/320 |
| 2,656,616 | 10/1953 | Hewitt, Jr. | 33/313 |
| 2,958,512 | 11/1960 | Hemphrey | 175/320 |
| 3,047,313 | 7/1962 | Bruce | 175/320 X |
| 3,232,638 | 2/1966 | Hollander | 175/320 X |
| 4,366,971 | 1/1983 | Lula | 138/DIG. 6 X |
| 4,514,236 | 4/1985 | Cook et al. | 148/12 E X |
| 4,688,828 | 8/1987 | Shaffer | 138/DIG. 6 X |

*Primary Examiner*—Stephen J. Novosad
*Attorney, Agent, or Firm*—Arnold, White & Durkee

[57] ABSTRACT

Improved drill collars and their manufacture include the assembly of a body member formed of an appropriate high strength material, and a liner within the body. The body member will provide the majority of the strength and weight required of the drill collar, while the liner will be constructed of a material offering improved resistance to corrosion and stress corrosion cracking. The liner may be formed of a metal alloy, and may be retained within the body member by deforming the liner radially outwardly to establish an interference fit with the interior bore of the body member. A sealant may also be placed with the collar between the liner and the body member to seal any space between the two members.

9 Claims, 1 Drawing Sheet

DRILL STRING DRILL COLLARS

BACKGROUND OF THE INVENTION

The present invention relates generally to improved drill string drill collars and their manufacture, and more specifically relates to drill string survey collars, each formed of a plurality of materials to facilitate improved resistance to stress corrosion cracking and corrosion.

When magnetic survey instruments are utilized to survey a well bore, such as with measurement-while-drilling operations, non-magnetic drill collars, also known as "survey collars," must be utilized in the drill string to isolate the surveying instruments from magnetic disturbances which would otherwise be created by the drill pipe and other magnetic components in the well. Generally, the practice has been to make the survey collars from austenitic stainless steel.

In the mid- to late-1970s, drilling companies began to use high chloride muds in their drilling opertions. While this use has had an advantageous effect on drilling operations, it has had the detrimental side effect of inducing corrosion in the survey collars and other equipment used in the hole. In addition, it was discovered that it contributed to the stress corrosion cracking of the survey collars, thus reducing their life from a preferable 6-8 years to as little as 6-8 months.

Various methods have been tried by the industry to alleviate both the corrosion and the stress corrosion cracking problems. One early solution has been to make the non-magnetic survey collars from various special alloys which exhibit improved resistance to corrosion and/or to stress corrosion cracking. These alloys, while accomplishing in some part both of these objectives, suffered from a number of other problems. For example, the characteristics of the alloys required to make them both non-corrosive and resistant to stress corrosion cracking tended also to make the collars more susceptible to "galling" of the threads, which damaged the surfaces of the threads. This susceptibility to galling meant the collars required frequent remachining which resulted in down time and repair costs that were unacceptable. In addition, drill collars made from these alloys were less successful at alleviating the stress corrosion cracking problems than they were in alleviating the corrosion problem.

Another attempt to solve the problem was to return to using collars of austenitic stainless steel, which were less subject to galling, and to induce both axial compressive stress and hoop compressive stress in them. This axial and compressive hoop stress has been performed by "peening" the interior of the survey collar with peening shot or a peening hammer or by rolling tools. This peening effectively deforms the interior surface of the collar axially, circumferentially, and radially to effectively apply both compressive stress and hoop stress to the interior of the collar. The application of these stresses substantially alleviated the stress-cracking problems. However, this partial solution did not alleviate the corrosion problem.

Accordingly, the present invention provides a new method and apparatus which provides non-magnetic survey collars, and methods for their manufacture, which exhibit improved resistance to stress corrosion cracking and corrosion and yet which maintain optimal structural strength.

SUMMARY OF THE INVENTION

Survey collars formed in accordance with the present invention include a body member formed of an appropriate high strength material, such as austenitic stainless steel, and a generally tubular liner within the body. In a particularly preferred embodiment, the liner will be a metallic liner formed of an alloy which exhibits relatively improved resistance to corrosion and stress corrosion cracking. In this particular preferred embodiment, the liner will be secured and retained in position within the body member by deforming the liner radially outwardly to form an interference fit with the interior bore of the body member.

The present invention also contemplates a new means to repair collars with stress corrosion cracks or corrosion on their inside diameters. For such repairs, the damaged portion of the collar is removed, such as by boring, and a liner of the same or of a different material is inserted and secured, such as by deforming, within the collar.

DESCRIPTION OF THE PREFERRED EMBODIMENT

Figure 1:
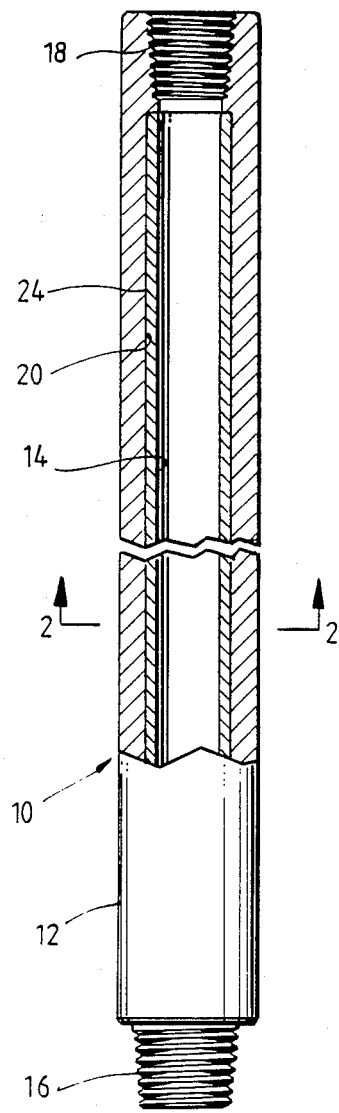
FIG. 1 depicts a survey collar in accordance with the present invention, illustrated from a side view and partially in vertical section.
Figure 2:
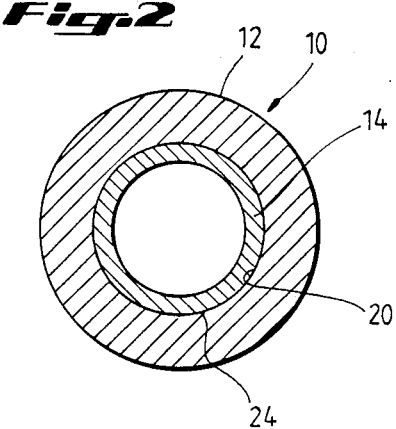
FIG. 2 depicts the drill collar of FIG. 1, illustrated in horizontal section.

Referring now to FIGS. 1 and 2, therein is depicted a survey collar 10 formed in accordance with the present invention. Survey collar 10 includes a body member 12 and an interior liner 14. Body member 12 provides the primary structure of the drill collar, in that it includes the pin connection 16 and the box connection 18 utilized to couple the collar within a drill string. Body member 12 is preferably constructed of a relatively high strength, high density, non-magnetic metal. In this preferred embodiment body member 12 is constructed of austenitic stainless steel. In one embodiment, liner 14 will preferably be formed of a non-magnetic metal which is electrochemically compatible with the material of which body member 12 is formed. For example, where austenitic stainless steel is utilized for body member 12, body member may advantageously be formed of conventional materials, such as those marketed under the designations: Carpenter 15-15LC; VEW P350; Eastman Christensen Christalloy 100. When such alloys are utilized, liner 14 could be formed of one of a different alloys less susceptible to corrosion and stress cracking, such as, for example, those marketed under the designations: Sandvik Sanicro 28; Nitonic 50; and Inconel 718.

In another advantageous embodiment, the materials for body member 12 and liner 14 may be selected to allow liner 14 to provide cathodic protection for body member 12. With cathodic protection, one metal is utilized as the sacrificial anode of a cell of which the member to be protected forms the cathode. One possible combintaion of body member and liner which would provide cathodic protection would be to use an aluminum liner in an austenitic stainless steel body member 12.

To maintain the full bore of the survey collar and to accommodate liner 14, body member 12 must have an interior bore, indicated generally at 20, which will accommodate the diameter of liner 14 and allow liner 14 to maintain the interior diameter which is required for the collar. Body member 14 may thus either be originally formed with this relatively enlarged bore 20, or conventionally-configured drill collars may be bored to accommodate liner 14. The interior diameter of body member 12 depends upon a number of interrelated characteristics, including the necessary finished interior diameter of drill collar assembly 10, the desired thickness of the liner, and the necessary clearance for insertion of the liner. While the clearance of the liner within the drill collar can vary depending upon the characteristics and circumstances surrounding the particular use, a clearance on the order of approximately 0.020 of an inch will typically be sufficient to facilitate the insertion of liner 14 into body member 12. The thickness of the liner assembly will be dependent upon several factors, including: (a) the expense of the liner alloy; (b) the necessary liner thickness, so that it will properly fulfill its non-corrosive and stress-cracking resistant function; (c) the weight of the alloy, so that necessary weight of the survey collar is maintained; and (d) where the liner is to be deformed into an interference fit within the body member, the malleability of the liner alloy.

Once the desired thickness of the liner 14 is determined and body member 12 is formed to the appropriate interior diameter, liner 14 is inserted within body member 12. As indicated earlier herein, in one preferred embodiment, liner 14 will be retained within body member 12 by deforming liner 14 so as to bring its outside surface 24 substantially in contact with the inside surface of body member 12 such that an interference fit is established. The deformation should be of such a degree that the "fit" of the liner within the collar is at least sufficient to hold the liner within the collar under the ordinary stresses of drilling operations. For most suitable metals, it is anticipated that liner 14 should have a wall thickness of from 0.062 inches to 0.25 inches. For most metals, a wall thickness of greater than 0.25 inches will make it excessively difficult to deform liner 14 within body member 12 through use of conventional techniques.

The deformation of liner 14 within body member 14 may be performed by any of a variety of conventional processes. For example, a particularly preferred method of deforming liner 14 is through use of pneumatic hammers in a conventional "peening" process. In such a process, the pneumatic hammers have rounded contact heads and are actuated to peen the full interior surface of liner 14. This peening will deform the liner and establish the necessary interference fit within the body member.

An additional advantage of deforming liner 14 within body member 12 through the peening process is that it will induce hoop and compressive stresses in the liner, as discussed earlier herein. The strike of the rounded peening head against the liner can be seen to expand the inside surface of the liner in a direction parallel to the axis of the body member 12 thus inducing axial compressive stress. Similarly, the strike will also expand the surface of the liner in circumferential direction thus inducing hoop compressive stress. Thus, in addition to expanding the liner 14 so that it tightly fits with the body member 12, the peening process will also induce axial and hoop compressive stresses within the liner 14 and, in some cases, within the body member 12 itself, to make the collar 10 optimally resistant to stress cracking.

Other conventional deformation techniques may be useful in various types of applications. These techniques include rolling techniques and explosive bonding or plating techniques more commonly used by the industry to fuse flat liners onto flat plates. Conventional rolling techniques would typically be useful only on relatively thinner liners than those which may be inserted through use of the peening technique.

A further result of using a corrosion-resistant liner within a less expensive non-magnetic material comprising the bulk of the collar is that the total cost of the collar is lowered. Accordingly, the stress-cracking resistance and corrosion resistance can be met by the more expensive liner and the galling resistance can be met by the less expensive alloy used for the bulk of the collar. The metallic liner alloy does not have to meet the strength and density requirements required of a material used to make the entire collar, and thus even the liner material may in some cases be less expensive than the stress corrosion resistant alloy used to make an entire drill collar.

Figure 3:
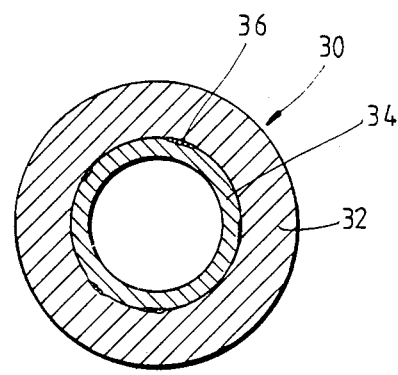
FIG. 3 depicts an alternative embodiment of a drill collar in accordance with the present invention.

Referring now to FIG. 3, there is depicted an alternative embodiment of a survey collar 30 in accordance with the present invention. Survey collar 30 again includes a body member 32 and a liner 34. Survey collar 30 is substantially similar to survey collar 10 of FIGS. 1 and 2, with the exception that a volume of sealant 36 is placed between the body member 32 and the liner 34. This sealant can be one of a number of different commercially available materials, including plastic coatings, glues, rubber coatings, etc. Sealant 36 may serve several purposes.

In one method of forming survey collar 30 in accordance with the present invention, a volume of sealant, preferably generally in the form of a sealant layer, such as a plastic coating, can be applied to the outside diameter of liner 34 and allowed to set and become affixed to liner 34 before its insertion into body member 32. Alternatively, the sealant may be applied to the inside surface of body member 32 before insertion of liner 34. In either instance, liner 34 may then be deformed as decribed previously for collar 10 of FIGS. 1 and 2. When the deformation process is complete, the plastic sealant layer 36 will be tightly crushed between the outside surface of liner 34 and the inside surface of body member 32. It should be recognized that where a sealant layer 36 is to be placed between liner 34 and body member 32, it may be necessary to increase the clearance between liner 14 and body member 32.

Sealant layer 36 will preferably include a sealant with suitable high chemical resistance and high temperature properties to virtually assure that the highly corrosive chloride drilling muds cannot seep or be forced into any spaces remaining between the deformed liner and the body member. A sealant such as that marketed under the designation TK-34 by AMF Tuboscope Co. should perform satisfactorily for most applications. While it is not perceived as likely that the drilling mud can force its way into any such spaces between a deformed liner and collar without a sealant, sealant layer 36 should assure that no drilling mud enters such spaces, thereby preventing the threat of corrosive action in these spaces.

Additionally, in some applications, sealant layer 36 may be formed of an adhesive sealant which may be utilized to actually retain liner 34 within body member 32. In such an embodiment, the need for peening or otherwise deforming the liner 34 would be obviated.

As indicated earlier herein, the method of the present invention may also be used to repair cracked, corroded or otherwise damaged, conventional survey collars. Collars with stress corrosion cracking typically have cracks along their inside surface. In a manner well known in the art, an ultrasonic detection device is used to determine the location and severity of the cracks within the collar. In accordance with the present invention, the collar can be bored out along its inside diameter to a diameter sufficient to remove all of, or a majority of, the cracks which under ordinary drilling operations could be anticipated to later cause failure of the collar. Once the damaged material is bored from the inside diameter of the collar, a liner may be inserted within the collar and deformed to achieve a fit as previously described. It should be noted, however, that in some applications it may be desirable to have a collar all of one material. In this case, a liner of the same material as the collar may be inserted and deformed to form a collar of one material that is operationally indistinguishable from an original collar.

In the repair operation, the addition of a sealant in certain circumstances provides an additional benefit. The introduction of a sealant between the inserted liner and the bored-out collar with the stress corrosion cracks will, to a certain degree, cause the sealant to flow into, and to seal, any cracks in the collar that were not removed by the boring operation. The sealant layer will not only help prevent further stress corrosion cracking but will prevent drilling mud from being forced into the interstitial spaces created by the cracks that are left in the collar.

While the present invention has been described primarily in terms of inserting a metallic liner into a body member, it should be understood that in some applications it may be possible and desirable to utilize a non-metallic liner, such as one constructed of fiberglass, epoxy matrix, or other suitable hard and durable material. Such products clearly may not be suitable for placement through deformation techniques. Accordingly, the use of a sealant or adhesive/sealant may be necessary. Additionally, it should be recognized that although it is preferred that the entire bore of the body member be adapted to receive a liner, that the liner may extend for less than the full length of the drill collar and may be retained in a position within the body member by retaining rings, retention pins, or other suitable apparatus.

While preferred embodiments of the present invention have been described herein it should be understood that changes may be made in the techniques and structures described and illustrated herein without departing from the spirit and scope of the present invention.

What is claimed is:

1. A non-magnetic drill collar, comprising:
   a drill collar body member formed of a first non-magnetic material; and
   a generally rigid corrosion resistant liner, said liner conformingly retained within said body member.

2. The drill collar of claim 1, wherein said liner is formed of a non-magnetic metal 3. The drill collar of claim 2, wherein said liner is formed of a second non-magnetic metal.

4. The drill collar of claim 1, wherein said liner is retained within said body member by an interference fit between said liner and said body member.

5. The drill collar of claim 1, further comprising a volume of sealant between said body member and said liner.

6. A non-magnetic survey collar, comprising:
   a drill collar body member formed of a first non-magnetic metal, said body member adapted to couple within a drill string, said body member formed of a generally non-magnetic metal; and
   a liner formed of a second non-magnetic metal, said liner conformingly retained within said body member.

7. The survey collar of claim 6, wherein said liner is retained within said body member at least partially by an interference fit between said liner and said body member.

8. The survey collar of claim 7, wherein said liner is formed of a second non-magnetic metal which is more resistant to stress corrosion cracking in well fluids, relative to said first magnetic metal of which said body member is formed.

9. The survey collar of claim 6, further comprising a volume of sealant, said sealant located between said liner and said body member.

* * * * *